United States Patent
Abdelaziz

(10) Patent No.: US 8,176,138 B1
(45) Date of Patent: May 8, 2012

(54) METHOD AND APPARATUS FOR SYSTEM DESCRIPTION AND PROVISIONING

(75) Inventor: Mohamed M. Abdelaziz, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1291 days.

(21) Appl. No.: 10/867,236

(22) Filed: Jun. 14, 2004

Related U.S. Application Data

(60) Provisional application No. 60/557,170, filed on Mar. 29, 2004.

(51) Int. Cl.
*G06F 15/16* (2006.01)

(52) U.S. Cl. ...................................... 709/207

(58) Field of Classification Search .................... 709/207
See application file for complete search history.

(56) References Cited

U.S. PATENT DOCUMENTS

| | | | |
|---|---|---|---|
| 5,842,011 A | | 11/1998 | Basu |
| 5,948,101 A | * | 9/1999 | David et al. .......... 713/2 |
| 2002/0029256 A1 | * | 3/2002 | Zintel et al. .......... 709/218 |
| 2002/0078340 A1 | * | 6/2002 | Baitinger et al. .......... 713/2 |
| 2004/0015293 A1 | * | 1/2004 | Randazzo et al. .......... 701/213 |

OTHER PUBLICATIONS

Li Gong, Sun Microsystems, Inc., "Project JXTA: A Technology Overview," Apr. 25, 2001, 11 pages.*
Sun Microsystems, Inc., "Project JXTA: An Open, Innovative Collaboration," Apr. 25, 2001, 6 pages.

* cited by examiner

*Primary Examiner* — Hussein Elchanti
*Assistant Examiner* — Maceeh Anwari
(74) *Attorney, Agent, or Firm* — Robert C. Kowert; Meyertons, Hood, Kivlin, Kowert & Goetzel, P.C.

(57) ABSTRACT

Method and apparatus for system description and provisioning. In one embodiment, a system description and provisioning mechanism may be provided as a component of system firmware that, during the pre-boot process of the system, may collect information about the system and represent the information in a peer-to-peer platform advertisement. The advertisement may be broadcast or multicast on the network and intercepted by a control station. The control station may assign an IP address to the new system and, based on the information in the advertisement, provision the system to the specific needs of the data center/network environment. In one embodiment, provisioning may be accomplished by issuing commands such as boot from disk and partition or boot from the network (given a particular network address) with a specific image.

45 Claims, 6 Drawing Sheets

```
<?xml version="1.0"?>
<!DOCTYPE jxta:System>
    <jxta:System xmlns:jxta="http://jxta.org">
        <id>00:00:0a:0b:0c:0e</id>
        <type>x86</type>
        <name>V65x</name>
        <serial>1S12345680</serial>
        <mem>512MB</mem>
        <bus>400MHZ</bus>
        <cpu serial=CPSN000001001>3GHZ</cpu>
        <if mac=00:00:0a:0b:0c:0e>0.0.0.0</if>
        <sd type=HDA capacity=120GB>
            <!-- Optional element -->
            <slice number=# active=true|false>fat32</slice>
        </sd>
        ......
</jxta:System>
```

FIG. 3

```
<?xml version="1.0"?>
<!DOCTYPE jxta:command>
    <jxta:System xmlns:jxta="http://jxta.org">
        <cmd value=command>
            <arg>arg1</arg>
            <arg>arg2</arg>
        </cmd>
</jxta:command> e.g.
<cmd value=load>
    <arg>slamd://slamdhost/webserver.img</arg>
    <arg>/dev/dev/ide0/s0</arg>
</cmd>
```

FIG. 4 form (e.g., JXTA™) advertisement. Once the system is initialized, and device maps of the system are represented in an advertisement, the advertisement may be broadcast or multicast on the network and intercepted by a control station or by other systems.
METHOD AND APPARATUS FOR SYSTEM DESCRIPTION AND PROVISIONING

PRIORITY CLAIM

This application claims benefit of priority of provisional application Ser. No. 60/557,170 entitled "Method and Apparatus for System Description and Provisioning" filed Mar. 29, 2004.

BACKGROUND OF THE INVENTION

1. Field of the Invention

This invention relates to computer systems, and more particularly to describing and provisioning systems installed in network environments.

2. Description of the Related Art

Today's systems (e.g., personal computers and servers) require human intervention to configure, install, and organize as part of a network. Such a requirement may be costly, time-consuming and cumbersome. In a heterogeneous data center or network environment with many heterogeneous nodes (e.g. with 1500 nodes of various types, with different operating systems and application requirements), considerable effort may be required to set up these nodes, which in many if not most cases require human input for each node. In addition, there may be a considerable amount of human effort required to determine a system configuration, which sometimes involves visual inspection of the installed node. There may also be a considerable amount of effort needed on the server side, which in most cases relies on primitive system descriptors (such as a MAC address, regions, etc) to associate the system with a specific configuration.

Conventionally, to install systems in a data center/network environment, the administrator has to figure out what kind of Ethernet cards are installed on the systems, go to a server, and configure the server based on the MAC addresses. The administrator has to specify a specific network boot image that the machines will use to boot. This requires manual entry at each system to be installed, perhaps including opening up the machine to figure out what kind of network interfaces there are, MAC addresses, etc. In conventional systems such as DHCP, the only descriptor of a system that is provided is the MAC address. The MAC address does not reflect anything as far as the platform type, processor type, etc. Using MAC addresses, it is impossible to distinguish between two types or configurations of systems.

JXTA™

Sun's JXTA™ is an exemplary peer-to-peer platform. Peer-to-peer platforms such as JXTA may provide protocols for building networking applications that thrive in dynamic environments. JXTA technology is a set of open protocols that allow any connected device on the network ranging from cell phones and wireless PDAs to PCs and servers to communicate and collaborate in a peer-to-peer (P2P) manner. JXTA peers create a virtual network where any peer can interact with other peers and resources directly even when some of the peers and resources are behind firewalls and NATs or are on different network transports. In JXTA, every peer is identified by an ID, unique over time and space. Peer groups are user-defined collections of entities (peers) that may share a common interest. Peer groups are also identified by unique IDs. Peers may belong to multiple peer groups, discover other entities and peer resources (e.g. peers, peer groups, services, content, etc.) dynamically, and publish themselves and resources so that other peers can discover them.

SUMMARY

Embodiments of a method and apparatus for system description and provisioning are described. In one embodiment, a firmware-level system description and provisioning mechanism may be provided. As a component of the firmware, during the pre-boot process, information about the system may be collected and represented in a peer-to-peer platform (e.g., JXTA™) advertisement. Once the system is initialized, and device maps of the system are represented in an advertisement, the advertisement may be broadcast or multicast on the network and intercepted by a control station or by other systems.

Once the system is discovered by the control station, the control station may assign an IP address to the new system. Based on the information represented in the advertisement, the control station has enough information to provision the system to the specific needs of the data center/network environment. In one embodiment, provisioning may be accomplished by issuing commands such as boot from disk and partition, or boot from the network (given a particular network address) with a specific image.

Embodiments of the system description and provisioning mechanism may provide a rich system description that may be used to create a system-specific boot image based on the system configuration, and may provide the elements to generate a descriptive site view. This information is available as soon as the system firmware has initialized; therefore, custom system configuration and provisioning may be automated by a control station in a data center/network environment.

In one embodiment, the system description and provisioning mechanism may implement a subset of peer-to-peer platform (e.g., JXTA™) protocols, while leveraging a peer-to-peer platform stack on the server (control station) side. This information may be stored and made available to other data centers/network environments within the enterprise network. In one embodiment, the subset of peer-to-peer platform protocols may include one or more of, but is not limited to: an Endpoint protocol; a binary message format; a Resolver Query, and Response protocol; and a Discovery Response Protocol Note that JXTA™ is used as an exemplary peer-to-peer platform for implementing embodiments of the system description and provisioning mechanism; other peer-to-peer platforms, or even other mechanisms than peer-to-peer platforms, may be used to implement embodiments of the system description and provisioning mechanism.

In one embodiment, the system description and provisioning mechanism implements the peer-to-peer platform protocols in firmware so that the system description and provisioning mechanism can be "chained" to the system BIOS. After the system BIOS has initialized the motherboard, it may then initialize the system description and provisioning mechanism, which may scan the motherboard for network interfaces, scan the bus (e.g. PCI bus) for other devices, and scan the CPU, disk drives, and any installed devices on the system board. Alternatively, a system map may be generated by some other component or module than the system description and provisioning mechanism, and the system description and provisioning mechanism may then access the generated system map to obtain the system configuration information. Some or all of that system information may then be represented in one or more advertisements (e.g. XML advertisements). The system information may be inserted in a JXTA binary message, which may be addressed to a specific group. The JXTA message may then be broadcast or multicast on the network without the need for an assigned IP address. That information may be picked up by one or more JXTA peers and/or control stations on the network. The system information may be stored on the peer(s) or control station(s), and may be used, for example, for customizing a boot image for the system (peer) which may be used to initialize or install the system and to provision the system according to the control station specification so that the system may become part of the data center/network environment.

BRIEF DESCRIPTION OF THE DRAWINGS

FIG. 3 illustrates an exemplary system advertisement that may be generated by a system description and provisioning mechanism according to one embodiment.

FIG. 4 illustrates an exemplary system description and provisioning mechanism message generated by a control station according to one embodiment.

Figure 1:
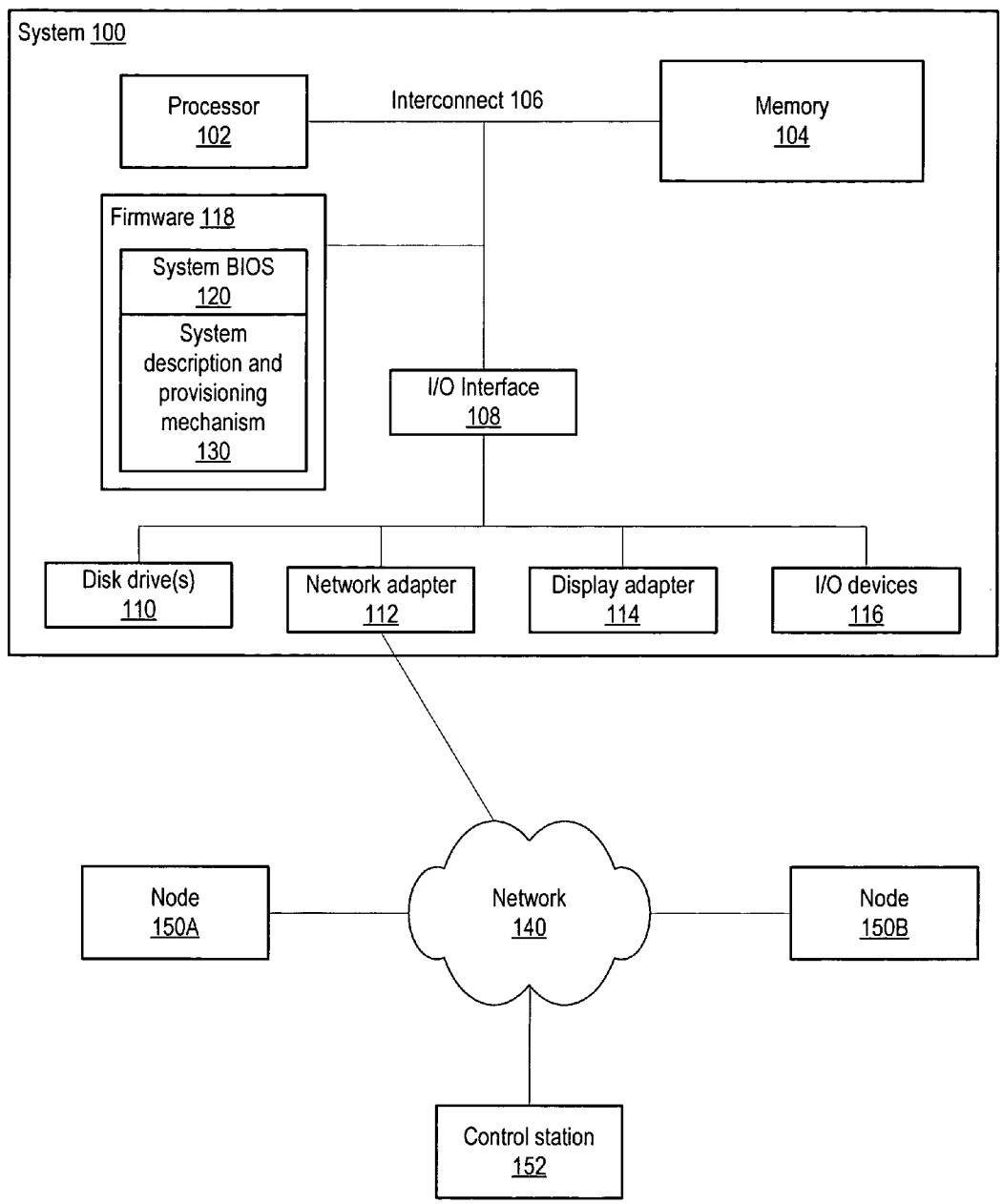
FIG. 1 illustrates an exemplary system implementing a system description and provisioning mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for system description and provisioning are described. In one embodiment, a firmware-level system description and provisioning mechanism may be provided. As a component of the firmware, during the pre-boot process, information about the system (e.g. CPU and speed, physical RAM, MAC address, installed disks, active partitions, file system types, etc.) may be collected and represented in a peer-to-peer platform (e.g., JXTA™) advertisement. Once the system is initialized, and device maps of the system are represented in an advertisement, the advertisement may be broadcast or multicast on the network and intercepted by one or more data center or network environment controllers, referred to herein as control stations, or by other systems (e.g. other peer-to-peer platform peers). In one embodiment, a control station may broadcast a query to discover new systems.

Once a system is discovered by the control station (either by receiving the broadcast or multicast advertisement or via query to discover new systems), the control station may assign an IP address to the new system using a standard protocol or a specific (custom) protocol. Based on the information represented in the advertisement, the control station may have enough information to provision the system to the specific needs of the data center/network environment. In one embodiment, provisioning may be accomplished by issuing commands such as boot from disk and partition, or boot from the network (given a particular network address) with a specific image. Once the boot process is started, the firmware may relinquish control to the operating system, and may pass along the advertisement created prior to the boot.

Embodiments of a system description and provisioning mechanism may provide a rich system description that may be used to create a system-specific boot image based on the system configuration, and may provide the elements to generate a descriptive site view. This information may be available as soon as the system firmware has initialized; therefore, custom system configuration and provisioning may be automated by a control station (or a federation of control stations) in a data center/network environment.

In one embodiment, the system description and provisioning mechanism may implement a subset of peer-to-peer platform (e.g., JXTA™) protocols, while leveraging a peer-to-peer platform (e.g., JXTA™) stack on the server side. This information may be stored and made available to other data centers/network environments within the enterprise network. In one embodiment, the subset of the peer-to-peer platform (e.g., JXTA™) protocols may include one or more of, but is not limited to: an Endpoint protocol; a binary message format; a Resolver Query, and Response protocol; and a Discovery Response Protocol.

In one embodiment, the system description and provisioning mechanism may implement enough of the peer-to-peer platform protocols to provide a descriptive representation (advertisement) of the system that allows more capable tasks, e.g. providing custom boot images configured or selected according to the provided system information, to be performed using the system information included in the advertisement than conventional mechanisms. In one embodiment, the system description and provisioning mechanism may define one or more protocols on top of the peer-to-peer platform (e.g., JXTA™) protocols through which a control station may interface with a system enabled with the system description and provisioning mechanism.

Note that, while JXTA™ is used herein as an exemplary peer-to-peer platform for implementing embodiments of the system description and provisioning mechanism, other peer-to-peer platforms, or even other mechanisms than peer-to-peer platforms, may be used to implement embodiments of the system description and provisioning mechanism.

FIGS. 1 through 5 illustrate means for collecting system information for a system during system initialization, means for broadcasting the collected system information on a network coupled to the system, means for receiving system provisioning instructions for the system customized for the network environment according to the broadcast system information, and means for booting the system according to the received system provisioning instructions.

FIG. 1 illustrates an exemplary system implementing a system description and provisioning mechanism according to one embodiment. System 100 may be any of various types of devices, including, but not limited to, a personal computer system, desktop computer, laptop or notebook computer, mainframe computer system, workstation, network computer, a consumer device such as a cell phone or PDA, a smart appliance, or in general any type of networkable computing device with a digital heartbeat.

System 100 may include at least one processor 102. The processor 102 may be coupled to a memory 104 via interconnect 106. Memory 104 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Interconnect 106 may be relied upon to communicate data from one component to another. For example, interconnect 106 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

Processor 102 and memory 104 of system 100 may couple to various other components via an input/output (I/O) interface 108, for example to one or more disk drives 110, to one or more I/O devices 116, to one or more display devices via display adapter 114, and to one or more networks via network adapter 112. The processor 102 and memory 104 may acquire instructions and/or data through the I/O interface 108. Through the I/O interface 108, the CPU 720 may also be coupled to one or more I/O components. Note that system 100 may include one or more other components coupled to the system via I/O interface 108 and/or via mechanisms other than the I/O interface 108.

In one embodiment, system 100 may include firmware 118 that may be used for non-volatile storage of system BIOS 120 and system description and provisioning mechanism 130. Firmware 118 may be coupled to processor 102 and memory 104 via interconnect 106. When system 100 is initially started, during the pre-boot process, system BIOS 120 and system description and provisioning mechanism 130, along with other code and/or information for use in initializing the system, may be loaded into memory 104 for execution by processor 102 in one embodiment.

While FIG. 1 illustrates firmware 118 as the distribution medium for the system description and provisioning mechanism 130, other distribution mechanisms or media may be used in some embodiments. In some embodiments, the system description and provisioning mechanism 130 may be distributed as part of the system or network card interface firmware (BIOS, openboot, etc). In some embodiments, the system description and provisioning mechanism 130 may be executed as part of the boot manager (e.g., lilo, grub, etc). In embodiments, the system description and provisioning mechanism may be part of system BIOS, network interface BIOS, the boot manager code, or the kernel itself.

System 100 may couple over a network 140 to one or more other devices (e.g. nodes 150 and control station 152) via one or more wired or wireless network interfaces. In one embodiment, before initialization of system 100, the system is physically connected to a network 140, for example by plugging a network cable into a network adapter 112, if the network is a wired network and the system 100 is to be connected via "wire". In one embodiment, for wireless networks, physically connecting system 100 to the network 140 is not required.

Figure 2A:
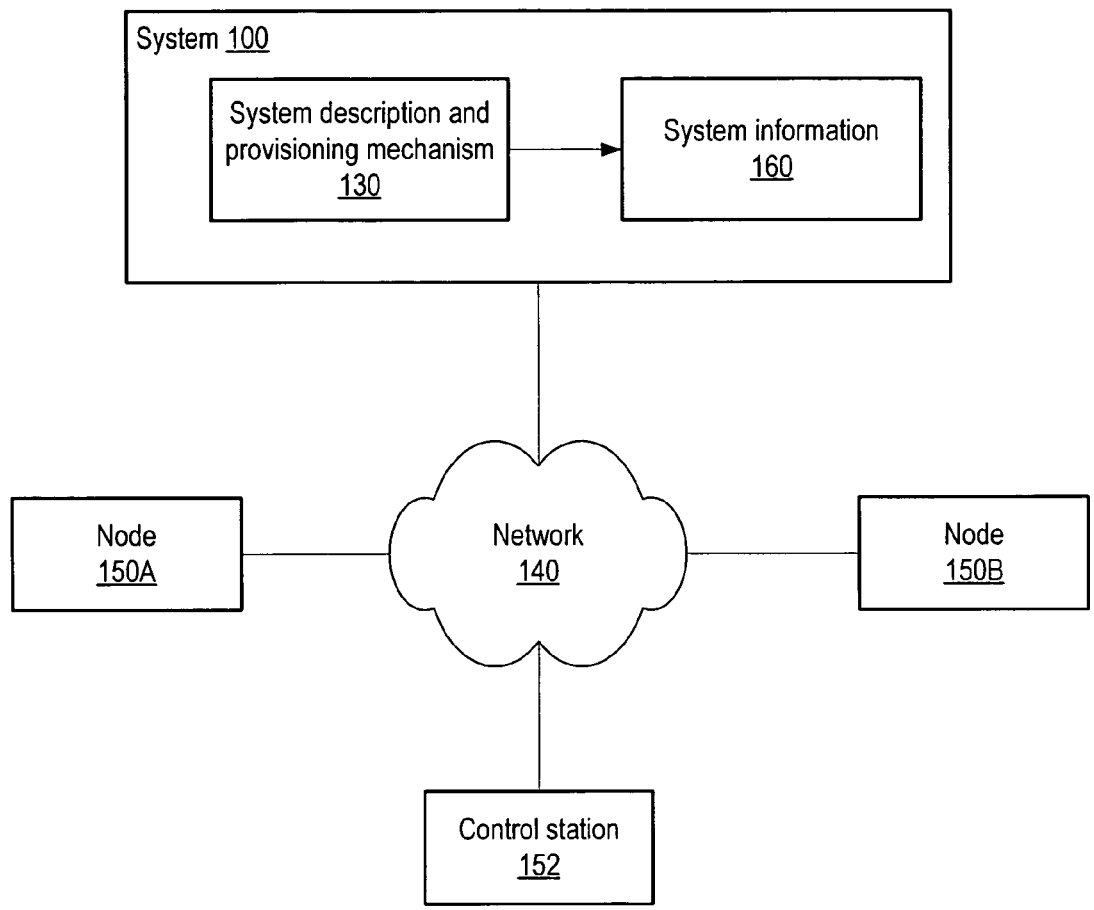
FIGS. 2A-2C illustrate system description and provisioning according to one embodiment.
Figure 2B:
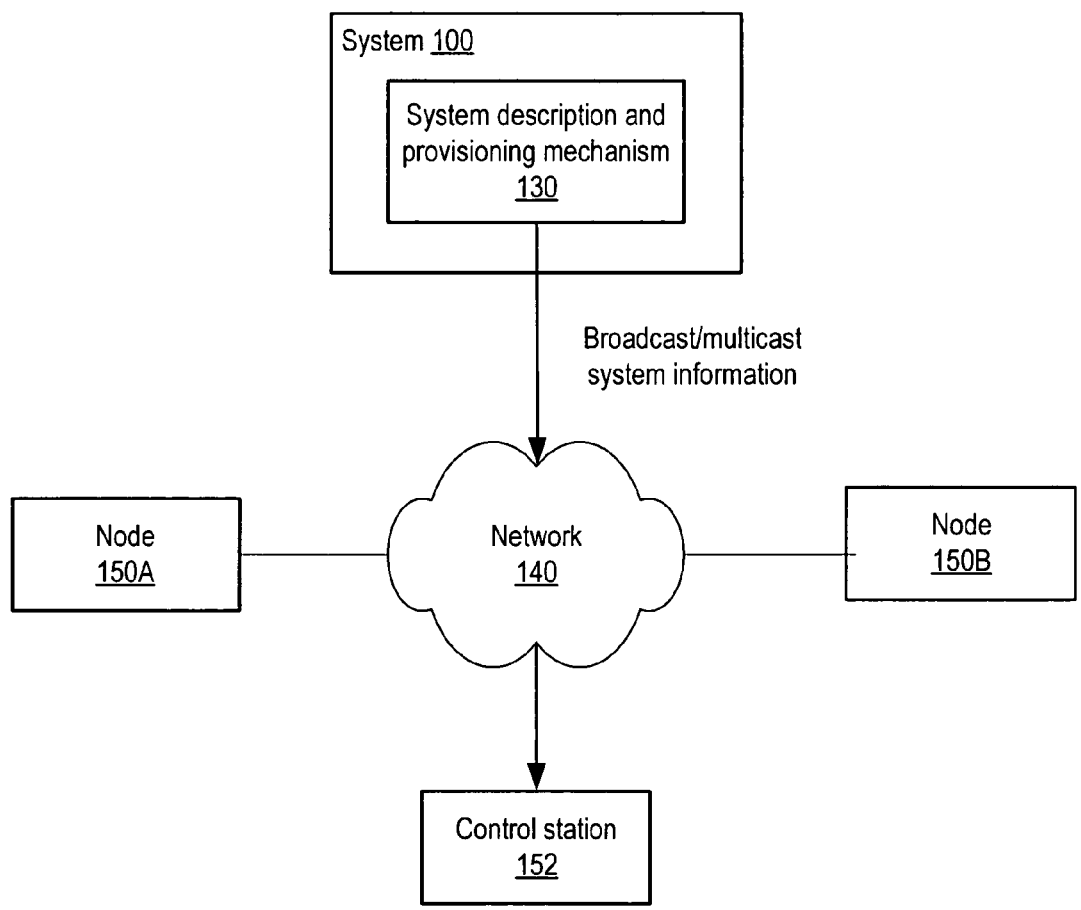
Figure 2C:
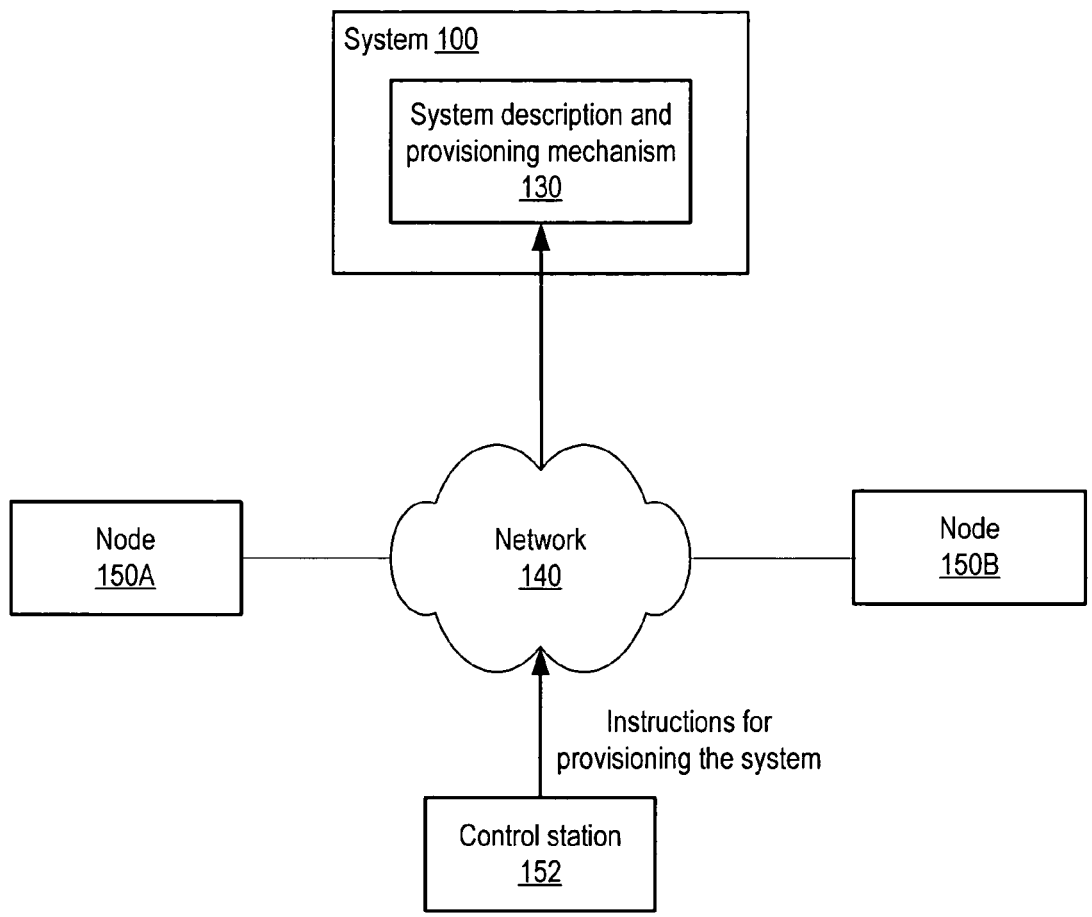

FIGS. 2A-2C illustrate system description and provisioning according to one embodiment. In FIG. 2A, a system description and provisioning mechanism 130, during initialization of a system upon installation in a network 140 environment, may collect system information 160 for the system 100. In one embodiment, the system description and provisioning mechanism 130 may be implemented in firmware on the system 100. In one embodiment, the system description and provisioning mechanism 130 may implement one or more peer-to-peer platform protocols. In one embodiment, the peer-to-peer platform protocols may include one or more of an endpoint protocol, a binary message format, a resolver protocol, and a discovery protocol. In one embodiment, the peer-to-peer platform may be JXTA.

In FIG. 2B, after collecting the information, the system description and provisioning mechanism 130 may broadcast or multicast the system information 160 on the network 140. In one embodiment, the system information 160 may be formatted according to a peer-to-peer platform (e.g., JXTA) advertisement format. In one embodiment, to broadcast or multicast the system information 160 on the network 140, the advertisement may be included in a peer-to-peer platform message. In one embodiment, the peer-to-peer platform message may be packaged in an Ethernet packet for broadcast or multicast on the network 140.

A control station 152 in the network environment may receive the broadcast or multicast system information. In FIG. 2C, the control station 152 may then instruct the system description and provisioning mechanism 130 to provision the system 100 according to the specific requirements of the network environment determined from the received system information. In one embodiment, to instruct the system description and provisioning mechanism 130 to provision the system 100, the control station 152 may transmit one or more messages to the system 100 including instructions for the system description and provisioning mechanism 130 to provision the system 100. In one embodiment, the one or more messages may include a discovery query message to re-query the system for existence or state changes. In one embodiment, the one or more messages may include one or more command messages to perform a specific task. Specific tasks may include one or more of, but are not limited to, IP address assignment, load an image to a specified location, auto configure an IP address or use DHCP to obtain an IP address, and boot the system using an indicated image.

In one embodiment, the control station 152, or alternatively an administrator at the control station 152, may determine or generate a boot image for the newly installed system 100 to use for provisioning the system according to the network environment. The boot image, or an indication of a location of the boot image on the network, may be sent to the system description and provisioning mechanism 130. If the boot image is sent, the system description and provisioning mechanism 130 may receive the boot image, store the boot image to a location specified by the control station 152, and the system 100 may be booted using the boot image. If an indication of a location of a boot image is sent, the system description and provisioning mechanism 130 may receive the indication of the boot image and direct the system 100 to boot using the indicated boot image.

In one embodiment, an IP address may not be required for a system including the system description and provisioning mechanism to be able to advertise itself on the network, as the system description and provisioning mechanism may utilize IP broadcast or multicast, which does not require an IP address to be assigned. In one embodiment, a control station may be able to respond to a system description and provisioning mechanism-enabled system using the system's MAC address. In one embodiment, an Ethernet packet may be broadcast (or, alternatively, multicast) on Ethernet conforming to peer-to-peer platform (e.g., JXTA™) protocols so that the packet may be picked up by peers or control stations. In one embodiment, using the peer-to-peer platform protocol(s), a multicast address may be specified. In other embodiments, rather than using a multicast address, the packet may be a broadcast packet. Within the Ethernet packet is a peer-to-peer platform-formatted message that includes the advertisement containing the system information. The system information may be used, for example, by a control station that receives the packet to customize a kernel or boot image for the system to boot up and self-configure.

In one embodiment, if the system description and provisioning mechanism is able to obtain an IP address (e.g., using a mechanism such as DHCP or AutoIP), the system description and provisioning mechanism may use the IP address. In one embodiment, the system description and provisioning mechanism may issue a DHCP request for an IP address on the network. If the mechanism does not get a response within a certain time, the mechanism may select an address from a range of addresses (e.g. a range starting with 169). The system description and provisioning mechanism may then determine if another system on the network is using that IP address. If not, the system description and provisioning mechanism may use the IP address. In one embodiment, if the IP address is in use, the system description and provisioning mechanism may try other addresses until it finds an available address, or alternatively may rely on a control station to assign an IP address.

As described above, in one embodiment, the system description and provisioning mechanism may implement a subset of peer-to-peer platform (e.g., JXTA™) protocols which may include one or more of, but are not limited to, an endpoint protocol, a binary message format, a resolver protocol, and a discovery protocol. In one embodiment, the system description and provisioning mechanism may implement these protocols in firmware so that the system description and provisioning mechanism can be "chained" to the system BIOS. After the system BIOS has initialized the motherboard, it may then initialize the system description and provisioning mechanism, which may scan the motherboard for network interfaces, scan the bus (e.g. PCI bus) for other devices, scan the CPU, disk drives, and any or all installed devices on the system board. Alternatively, a system map may be generated by some other component or module than the system description and provisioning mechanism, and the system description and provisioning mechanism may then access the system map to obtain the system configuration information. Some or all of that system information may then be represented in one or more advertisements (e.g. XML advertisements). The system information may be inserted in a peer-to-peer platform (e.g., JXTA™) binary message, which may be addressed to a specific group. The message may then be broadcast or multicast on the network without the need for an assigned IP address. That information may be picked up by one or more peer-to-peer platform peers and/or control stations on the network. The system information may be stored on the peer(s) or control station(s), and may be used, for example, for customizing a boot image for the system (peer) which may be used to initialize or install the system and provision the system according to the control station specification so that the system may become part of the data center/network environment.

In one embodiment, the system description and provisioning mechanism may be viewed as peer-to-peer platform (e.g., JXTA™) boot code that may be included in or with the system BIOS and that creates and broadcasts (or multicasts) an advertisement of the capabilities of the system that it is included in. The system description and provisioning mechanism may be viewed as a limited peer-to-peer platform peer that participates in a limited set of protocols that are sufficient to allow it to move on to the next step. A peer serving as a control station may collect advertisements containing system information for one or more newly-installed systems from the peer-to-peer platform messages in broadcast or multicast Ethernet packets, and may then use the collected system information to configure the systems according to the system information, including assigning IP addresses to the systems, and/or issuing a command such as "load a boot image from a particular address into a RAM drive" or "into disk 0, partition 0", etc.

Embodiments of the system description and provisioning mechanism may provide bare-metal automated configuration of newly installed systems. Systems that includes and embodiment of the system description and provisioning mechanism may be plugged in, turned on, and the systems will automatically advertise themselves. The advertisements may be picked up by control stations that understand the advertisements. A previously customized boot image may be selected for, provided or indicated to, and used on a new system, or alternatively the data center/network environment manager may customize and provision the systems programmatically from a control station.

Embodiments of the system description and provisioning mechanism may have a small footprint, may co-exist with the system BIOS, and may reside in the chain of execution. In one embodiment, the system BIOS first initializes the motherboard, and then the chain of execution is the boot order (e.g., floppy, disk, CD-ROM, or network). The system description and provisioning mechanism resides in the chain of execution, and is executed before moving on to the floppy, disk, CD-ROM, or network.

In one embodiment, the system description and provisioning mechanism may be executed as part of the boot process of the system. To support legacy systems, the administrator may specify the system description and provisioning mechanism as a boot image and configure the legacy systems to boot off the network. Once a system boots off the network, the system description and provisioning mechanism may be executed, and may advertise the system and wait for commands to perform the next instruction(s).

In one embodiment, the system description and provisioning mechanism may only execute if the system has not been configured. In one embodiment, the system description and provisioning mechanism may set a bit or other indicator after initial execution to indicate that it does not have to execute on subsequent reboots. In another embodiment, the system description and provisioning mechanism may be executed every time a system is booted.

Once a system is fully configured by a control station according to the system information provided in a broadcast or multicast message, the system may be a more capable machine that may implement a more complete set of the peer-to-peer platform (e.g., JXTA™) protocols than are implemented by the system description and provisioning mechanism. In one embodiment, if the machine is moved to another location, configuration into the new network environment may be performed at a higher level, e.g. using the more complete set of peer-to-peer platform protocols.

FIG. 3 illustrates an exemplary system advertisement that may be generated by a system description and provisioning mechanism according to one embodiment. In one embodiment, after system initialization, a system and device map may be generated. This map may be accessed by the system description and provisioning mechanism, where a system advertisement, in one embodiment represented in a markup language such as XML, may be created and advertised through broadcast or multicast on any installed network interface cards, or any other defined I/O interface (e.g., serial I/O, Bluetooth, etc.). This broadcast or multicast advertisement may, for example, be cached by a control station such as control station 152 of FIG. 1 for configuration and provisioning, and/or added to the site view.

In one embodiment, security may be addressed by distributing public keys in the system description and provisioning mechanism firmware, and private keys on the control station or site controller. In one embodiment, an MD5 checksum may be computed on all messages and signed with the private key to avoid any manipulation of messages sent over the wire.

Returning to FIG. 1, based on the information represented in the system advertisement, the control station 152 has enough information to administer the system 100 to the specific needs of the data center/network environment. The control station 152 may issue messages over IP including one or more of, but not limited to, the following:

Discovery Query message to re-query the system for existence, or state changes.

Command message to perform a specific task which may include, but is not limited to: IP address assignment; load an image to a specified location (RAM disk, partition, etc.); auto configure an IP address, or use DHCP; and boot an image.

FIG. 4 illustrates an exemplary system description and provisioning mechanism message generated by a control station such as control station 152 of FIG. 1 according to one embodiment. The message depicted in FIG. 4 illustrates an example of loading a boot image on slice 1 of disk 0, and is not intended to be limiting.

Figure 5:
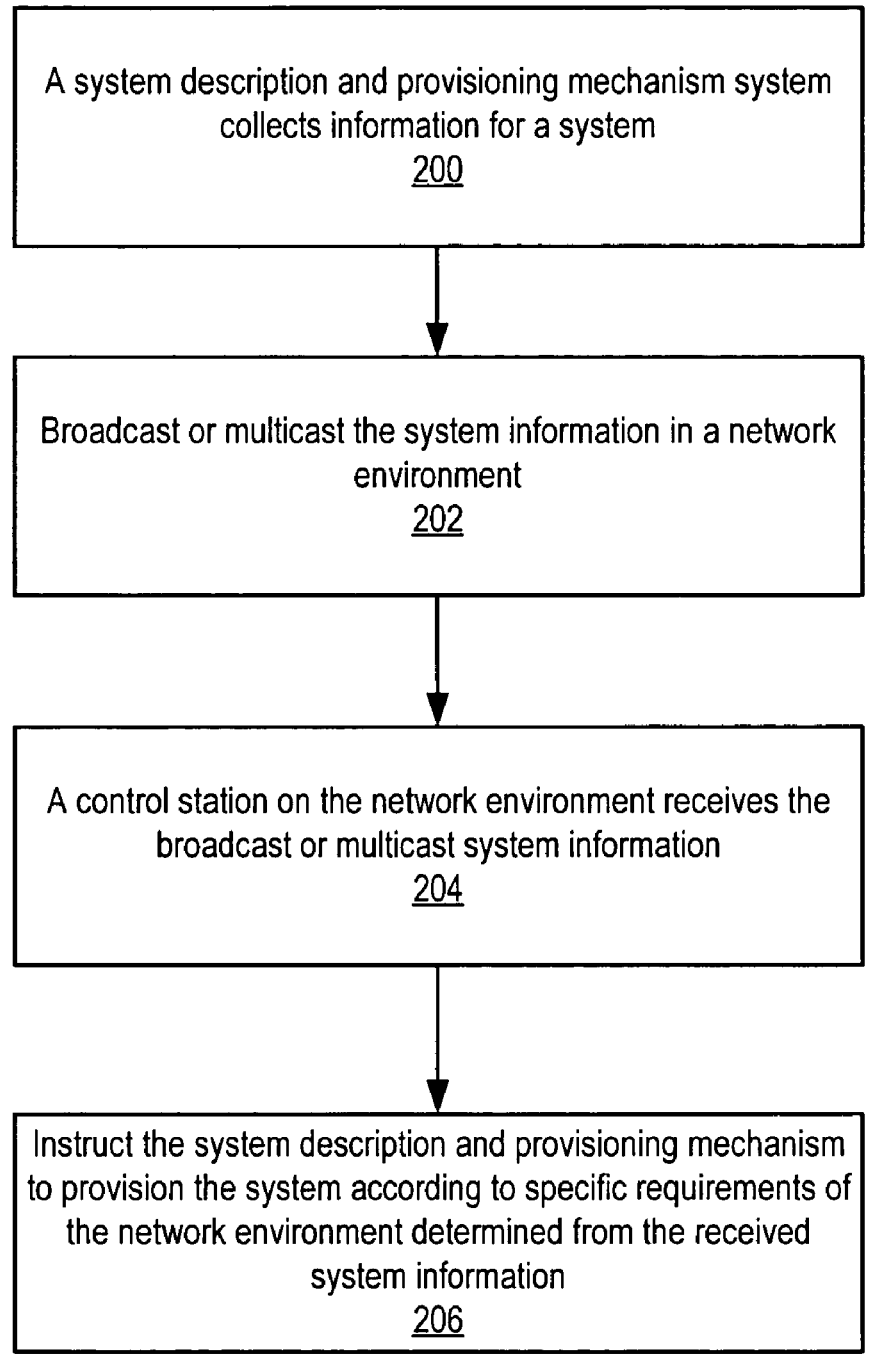
FIG. 5 is a flowchart of a method for system description and provisioning according to one embodiment.

FIG. 5 is a flowchart of a method for system description and provisioning according to one embodiment. As indicated at 200, a system description and provisioning mechanism, during initialization of a system upon installation in a network environment, may collect system information for the system. In one embodiment, the system description and provisioning mechanism may be implemented in firmware on the system. In one embodiment, the system description and provisioning mechanism may implement one or more peer-to-peer platform protocols. In one embodiment, the peer-to-peer platform protocols may include one or more of an endpoint protocol, a binary message format, a resolver protocol, and a discovery protocol. In one embodiment, the peer-to-peer platform may be JXTA.

After collecting the information, the system description and provisioning mechanism may broadcast or multicast the system information on the network, as indicated at 202. In one embodiment, the system information may be formatted according to a peer-to-peer platform (e.g., JXTA) advertisement format. In one embodiment, to broadcast or multicast the system information on the network, the advertisement may be included in a peer-to-peer platform message. In one embodiment, the peer-to-peer platform message may be packaged in an Ethernet packet for broadcast or multicast on the network.

A control station in the network environment may receive the broadcast or multicast system information, as indicated at 204. The control station may then instruct the system description and provisioning mechanism to provision the system according to the specific requirements of the network environment determined from the received system information, as indicated at 206. In one embodiment, to instruct the system description and provisioning mechanism to provision the system, the control station may transmit one or more messages to the system including instructions for the system description and provisioning mechanism to provision the system. In one embodiment, the one or more messages may include a discovery query message to re-query the system for existence or state changes. In one embodiment, the one or more messages may include one or more command messages to perform a specific task. Specific tasks may include one or more of, but are not limited to, IP address assignment, load an image to a specified location, auto configure an IP address or use DHCP to obtain an IP address, and boot the system using an indicated image.

In one embodiment, the control station, or alternatively an administrator at the control station, may determine or generate a boot image for the newly installed system to use for provisioning the system according to the network environment. The boot image, or an indication of a location of the boot image on the network, may be sent to the system description and provisioning mechanism. If the boot image is sent, the system description and provisioning mechanism may receive the boot image, store the boot image to a location specified by the control station, and the system may be booted using the boot image. If an indication of a location of a boot image is sent, the system description and provisioning mechanism may receive the indication of the boot image and direct the system to boot using the indicated boot image.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a processor; and
a computer storage medium storing instructions executable by the processor to implement a system description and provisioning mechanism on the system before the system is initialized, wherein the system description and provisioning mechanism implements at least a subset of a peer-to-peer platform protocol, such that during said initialization of the system, and upon installation of the system in a network environment, the system description and provisioning mechanism:
collects system information for the system, wherein the collected system information comprises a hardware configuration of the system;

includes the collected system information in a peer-to-peer platform advertisement that is formatted according to the peer-to-peer platform protocol;

broadcasts or multicasts the peer-to-peer platform advertisement containing the collected system information automatically on a network coupled to the system, wherein a control station separate from the system receives the broadcast or multicast collected system information, and in response, automatically determines custom provisioning instructions that are specific to the system, based on the collected system information and on specific requirements of the network environment in which the system is installed, and wherein the separate control station automatically determines different provisioning instructions specific to another system in response to receiving different collected system information from the other system;

receives one or more messages including the custom provisioning instructions that are specific to the system from the separate control station that received the broadcast or multicast collected system information; and provisions the system automatically according to the custom provisioning instructions received from the separate control station.

2. The system as recited in claim 1, wherein the peer-to-peer platform protocol includes one or more of an endpoint protocol, a binary message format, a resolver protocol, or a discovery protocol.

3. The system as recited in claim 1, wherein the peer-to-peer platform protocol includes one or more protocols to join peer groups, to dynamically discover other peer resources, or to publish peer resources for discovery by other peers.

4. The system as recited in claim 1, wherein the peer-to-peer platform advertisement is packaged in an Ethernet packet for broadcast or multicast on the network.

5. The system as recited in claim 1, wherein, to broadcast or multicast the system information on a network coupled to the system, no IP address for the system is required.

6. The system as recited in claim 1, wherein the one or more messages received from the control station include a discovery query message to re-query the system for existence or state changes.

7. The system as recited in claim 1, wherein the one or more messages received from the control station include one or more command messages to perform a specific task.

8. The system as recited in claim 7, wherein specific tasks include one or more of IP address assignment, load an image to a specified location, auto configure an IP address or use DHCP to obtain an IP address, and boot the system using an indicated image.

9. The system as recited in claim 1, wherein, to provision the system according to specific requirements of the network environment in which the system is installed, the instructions are further executable by the processor to cause the system description and provisioning mechanism to:

receive a boot image for the system from the control station that received the broadcast or multicast system information, wherein the boot image is determined by the control station according to the system information; and store the boot image to a location specified by the control station;

wherein the instructions are further executable by the processor to cause the system to boot using the stored boot image.

10. The system as recited in claim 1, wherein, to provision the system according to specific requirements of the network environment in which the system is installed, the instructions are further executable by the processor to cause the system description and provisioning mechanism to:

receive an indication of a boot image for the system from the control station that received the broadcast or multicast system information, wherein the boot image is determined by the control station according to the system information; and direct the system to boot using the indicated boot image.

11. A system, comprising:

a processor; and a memory coupled to the processor, wherein the memory stores program instructions executable by the processor to perform:

collecting system information for a first system during system initialization of the first system, wherein the collected first-system information comprises a hardware configuration of the first system, and wherein said collecting system information is performed by a part of the first system that implements at least a subset of a peer-to-peer platform protocol;

automatically broadcasting the collected first-system information on a network coupled to the system, wherein the collected first-system information is included in a peer-to-peer platform advertisement that is formatted according to the peer-to-peer platform protocol; and receiving first-system provisioning instructions that are customized for the first system from another separate system on the network, wherein the first-system provisioning instructions are customized by the separate system for the network environment according to the automatically broadcast collected first-system information;

wherein the separate system automatically determines different system provisioning instructions specific to a second system in response to receiving system information collected from the second system, and wherein the second system is separate from both the separate system and the first system.

12. The system as recited in claim 11, wherein the program instruction are further executable by the processor to perform booting the system according to the received system provisioning instructions.

13. A network system, comprising:

a computing device configured as a control station; and another computing device that implements a system comprising a system description and provisioning mechanism that implements at least a subset of a peer-to-peer platform protocol and, during initialization of the system upon installation in the network system, operates to:

collect system information for the system, wherein the collected system information comprises a hardware configuration of the system and is included in a peer-to-peer platform advertisement that is formatted according to the peer-to-peer platform protocol; and broadcast or multicast the peer-to-peer platform advertisement containing the collected system information automatically on the network;

wherein the control station is separate from the system, and wherein the control station operates to receive the broadcast or multicast collected system information, and in response:

automatically determine custom provisioning instructions that are specific to the system, based on the collected system information and on specific requirements of the network system determined from the received collected system information; and instruct the system description and provisioning mechanism to provision the system according to the automatically determined custom provisioning instructions and to specific requirements of the network system determined from the received collected system information wherein the control station automatically determines different provisioning instructions specific to another system in response to receiving different collected system information from the other system.

14. The network system as recited in claim 13, wherein the peer-to-peer platform protocol includes one or more of an endpoint protocol, a binary message format, a resolver protocol, or a discovery protocol.

15. The network system as recited in claim 13, wherein the peer-to-peer platform protocol includes one or more protocols to join peer groups, to dynamically discover other peer resources, or to publish peer resources for discovery by other peers.

16. The network system as recited in claim 13, wherein the peer-to-peer platform advertisement is packaged in an Ethernet packet for broadcast or multicast on the network.

17. The network system as recited in claim 13, wherein, to broadcast or multicast the system information on the network, no IP address for the system is required.

18. The network system as recited in claim 13, wherein, to instruct the system description and provisioning mechanism to provision the system according to specific requirements of the network system determined from the received system information, the control station operates to transmit one or more messages to the system including instructions for the system description and provisioning mechanism to provision the system.

19. The network system as recited in claim 18, wherein the one or more messages include a discovery query message to re-query the system for existence or state changes.

20. The network system as recited in claim 18, wherein the one or more messages include one or more command messages to perform a specific task.

21. The network system as recited in claim 20, wherein specific tasks include one or more of IP address assignment, load an image to a specified location, auto configure an IP address or use DHCP to obtain an IP address, and boot the system using an indicated image.

22. The network system as recited in claim 13,
wherein, to provision the system according to specific requirements of the network system determined from the received system information, the system description and provisioning mechanism further operates to:
receive a boot image for the system from the control station, wherein the boot image is determined by the control station according to the system information; and
store the boot image to a location specified by the control station;
wherein the system boots using the boot image.

23. The network system as recited in claim 13, wherein, to provision the system according to specific requirements of the network system determined from the received system information, the system description and provisioning mechanism operates to:

receive an indication of a boot image for the system from the control station, wherein the boot image is determined by the control station according to the system information; and direct the system to boot using the indicated boot image.

24. The network system as recited in claim 13, wherein the system description and provisioning mechanism is comprised in firmware on the system.

25. A method, comprising:
during initialization of a system upon installation in a network environment:
a system description and provisioning mechanism of the system collecting system information for the system, wherein the collected system information comprises a hardware configuration of the system, and wherein the system description and provisioning mechanism implements at least a subset of a peer-to-peer platform protocol and includes the collected system information in a peer-to-peer platform advertisement that is formatted according to the peer-to-peer platform protocol;
the system description and provisioning mechanism broadcasting or multicasting the peer-to-peer platform advertisement containing the collected system information automatically on the network;
a control station in the network environment receiving the broadcast or multicast collected system information collected by the system description and provisioning mechanism, and in response, automatically determining custom provisioning instructions that are specific to the system, based on the collected system information and on specific requirements of the network environment in which the system is installed; and
the control station sending the automatically determined custom provisioning instructions to the system description and provisioning mechanism and instructing the system description and provisioning mechanism to provision the system according to the automatically determined custom provisioning instructions and to specific requirements of the network environment determined from the received collected system information;
wherein the control station is separate from the system, and the control station automatically determines different provisioning instructions specific to another system in response to receiving different collected system information from the other system.

26. The method as recited in claim 25, wherein the peer-to-peer platform protocol includes one or more of an endpoint protocol, a binary message format, a resolver protocol, or a discovery protocol.

27. The method as recited in claim 25, wherein the peer-to-peer platform protocol includes one or more protocols to join peer groups, to dynamically discover other peer resources, or to publish peer resources for discovery by other peers.

28. The method as recited in claim 25, wherein said broadcasting or multicasting the system information on the network further comprises packaging the peer-to-peer platform advertisement in an Ethernet packet.

29. The method as recited in claim 25, wherein said instructing the system description and provisioning mechanism to provision the system according to specific requirements of the network environment comprises transmitting one or more messages including instructions for provisioning the system to the system description and provisioning mechanism.

30. The method as recited in claim 29, wherein the one or more messages include a discovery query message to re-query the system for existence or state changes.

31. The method as recited in claim 29, wherein the one or more messages include one or more command messages to instruct the system description and provisioning mechanism to perform a specific task.

32. The method as recited in claim 31, wherein specific tasks include one or more of IP address assignment, load an image to a specified location, auto configure an IP address or use DHCP to obtain an IP address, and boot the system using an indicated image.

33. The method as recited in claim 25, wherein said provisioning the system according to specific requirements of the network environment comprises:
the system description and provisioning mechanism receiving a boot image for the system from the control station, wherein the boot image is determined by the control station according to the system information;
the system description and provisioning mechanism storing the boot image to a location specified by the control station; and
booting the system from the stored boot image.

34. The method as recited in claim 25, wherein said provisioning the system according to specific requirements of the network environment comprises:
the system description and provisioning mechanism receiving an indication of a boot image for the system from the control station, wherein the boot image is determined by the control station according to the system information; and
the system description and provisioning mechanism directing the system to boot from the indicated boot image.

35. The method as recited in claim 25, wherein the system description and provisioning mechanism is comprised in firmware on the system.

36. A non-transitory computer-readable storage medium storing program instructions, wherein the program instructions are computer-executable to implement:
during initialization of a system upon installation in a network environment:
a system description and provisioning mechanism of the system collecting system information for the system, wherein the collected system information comprises a hardware configuration of the system, and wherein the system description and provisioning mechanism implements at least a subset of a peer-to-peer platform protocol and includes the collected system information in a peer-to-peer platform advertisement that is formatted according to the peer-to-peer platform protocol;
the system description and provisioning mechanism broadcasting or multicasting the peer-to-peer platform advertisement containing the collected system information automatically on the network;
wherein the collected system information is configured for use in provisioning the system according to specific requirements of the network environment in which the system is installed;
the system description and provisioning mechanism receiving one or more messages including custom provisioning instructions from a control station that received the broadcast or multicast collected system information, wherein the control station is separate from the system and determines the custom provisioning instructions based on the collected system information and the specific requirements of the network environment, and wherein the separate control station automatically determines different provisioning instructions specific to another system in response to receiving different collected system information from the other system; and
the system description and provisioning mechanism automatically provisioning the system according to the custom provisioning instructions received from the separate control station.

37. The computer-readable storage as recited in claim 36, wherein the peer-to-peer platform protocol includes one or more of an endpoint protocol, a binary message format, a resolver protocol, or a discovery protocol.

38. The computer-readable storage as recited in claim 36, wherein the peer-to-peer platform protocol includes one or more protocols to join peer groups, to dynamically discover other peer resources, or to publish peer resources for discovery by other peers.

39. The computer-readable storage medium as recited in claim 36, wherein, in said broadcasting or multicasting the system information on the network, the program instructions are further computer-executable to implement packaging the peer-to-peer platform advertisement in an Ethernet packet.

40. The computer-readable storage medium as recited in claim 36, wherein the one or more messages include a discovery query message to re-query the system for existence or state changes.

41. The computer-readable storage medium as recited in claim 36, wherein the one or more messages include one or more command messages to instruct the system description and provisioning mechanism to perform a specific task.

42. The computer-readable storage medium as recited in claim 41, wherein specific tasks include one or more of IP address assignment, load an image to a specified location, auto configure an IP address or use DHCP to obtain an IP address, and boot the system using an indicated image.

43. The computer-readable storage medium as recited in claim 36, wherein, in said provisioning the system according to specific requirements of the network environment, the program instructions are further computer-executable to implement:
the system description and provisioning mechanism receiving a boot image for the system from the control station, wherein the boot image is determined by the control station according to the system information;
the system description and provisioning mechanism storing the boot image to a location specified by the control station; and
booting the system from the stored boot image.

44. The computer-readable storage medium as recited in claim 36, wherein, in said provisioning the system according to specific requirements of the network environment, the program instructions are further computer-executable to implement:
the system description and provisioning mechanism receiving an indication of a boot image for the system from the control station, wherein the boot image is determined by the control station according to the system information; and
the system description and provisioning mechanism directing the system to boot from the indicated boot image.

45. The computer-readable storage medium as recited in claim 36, wherein the system description and provisioning mechanism is comprised in firmware on the system.

* * * * *